(12) United States Patent
Kean

(10) Patent No.: US 10,684,137 B2
(45) Date of Patent: Jun. 16, 2020

(54) WORK SITE MONITORING SYSTEM AND METHOD

(71) Applicant: Deere & Company, Moline, IL (US)

(72) Inventor: Michael G. Kean, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 265 days.

(21) Appl. No.: 15/825,583

(22) Filed: Nov. 29, 2017

(65) Prior Publication Data
US 2019/0162551 A1    May 30, 2019

(51) Int. Cl.
| | | |
|---|---|---|
| *G01C 21/36* | (2006.01) | |
| *G06F 16/583* | (2019.01) | |
| *G06F 16/51* | (2019.01) | |
| *G06F 16/29* | (2019.01) | |
| *G06K 9/00* | (2006.01) | |
| *G06T 3/40* | (2006.01) | |
| *B64C 39/02* | (2006.01) | |

(Continued)

(52) U.S. Cl.
CPC ......... *G01C 21/3647* (2013.01); *G06F 16/29* (2019.01); *G06F 16/51* (2019.01); *G06F 16/5854* (2019.01); *G06K 9/00* (2013.01); *G06T 3/40* (2013.01); *B64C 39/024* (2013.01); *B64C 2201/123* (2013.01); *G06Q 10/06313* (2013.01); *G06Q 50/08* (2013.01)

(58) Field of Classification Search
CPC . G01C 21/3647; G06F 16/5854; G06F 16/51; G06F 16/29; G06K 9/00; G06T 3/40; B64C 39/024; B64C 2201/123; G06Q 10/06313; G06Q 50/08
See application file for complete search history.

(56) References Cited

U.S. PATENT DOCUMENTS

| | | | |
|---|---|---|---|
| 8,295,644 B2 * | 10/2012 | Shulman | G01C 21/3647 382/298 |
| 2014/0188333 A1 * | 7/2014 | Friend | E02F 9/261 701/34.4 |

(Continued)

FOREIGN PATENT DOCUMENTS

DE    102016203077 A1    8/2017

OTHER PUBLICATIONS

German Search Report for application No. 102018218155.1 dated Sep. 23, 2019.

*Primary Examiner* — Courtney D Heinle
(74) *Attorney, Agent, or Firm* — Klintworth & Rozenblat IP LLP

(57) ABSTRACT

A work site monitoring system includes a communication component receiving image data representing at least one image of a work site captured by an imaging apparatus of an unmanned aerial device. The system further includes a controller, with memory and processing architecture for executing instructions stored in the memory, coupled to the communication component. The controller includes a scene module, an object module, and a map module. The scene module is configured to evaluate the image data and generate a scene image of the work site based on at least the image data. The object module is configured to identify at least a first object in the image and to abstract the first object as object symbology. The map module is configured to generate a work site map with the object symbology layered onto the scene image.

15 Claims, 11 Drawing Sheets

(51) Int. Cl.
*G06Q 10/06* (2012.01)
*G06Q 50/08* (2012.01)

(56) References Cited

U.S. PATENT DOCUMENTS

| | | | |
|---|---|---|---|
| 2015/0199106 A1* | 7/2015 | Johnson | G06F 3/011 |
| | | | 715/740 |
| 2016/0148421 A1* | 5/2016 | Friend | G06T 3/40 |
| | | | 345/629 |
| 2016/0237640 A1* | 8/2016 | Carpenter | E02F 9/267 |
| 2016/0321763 A1* | 11/2016 | Shike | G06Q 10/06313 |
| 2017/0161972 A1* | 6/2017 | Moloney | G07C 5/0841 |
| 2017/0175363 A1* | 6/2017 | Clarke | G05D 1/0094 |
| 2018/0129210 A1* | 5/2018 | Achtelik | G01C 5/00 |
| 2018/0196438 A1* | 7/2018 | Newlin | G05D 1/0214 |
| 2018/0202128 A1* | 7/2018 | Kurakane | E02F 9/26 |

* cited by examiner

WORK SITE MONITORING SYSTEM AND METHOD

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and to monitoring work vehicles.

BACKGROUND OF THE DISCLOSURE

In the construction, agriculture, mining, and forestry industries, many different types of work vehicles are operated to perform various tasks at work sites. Typically, multiple vehicles are used simultaneously and/or cooperatively in a number of tasks to accomplish an overall job. Managing and monitoring the entire work site may be challenging.

SUMMARY OF THE DISCLOSURE

The disclosure provides a system and method for monitoring a work site by through work site maps.

In one aspect, the disclosure provides a work site monitoring system with a communication component receiving image data representing at least one image of a work site captured by an imaging apparatus of an unmanned aerial device. The system further includes a controller, with memory and processing architecture for executing instructions stored in the memory, coupled to the communication component. The controller includes a scene module, an object module, and a map module. The scene module is configured to evaluate the image data and generate a scene image of the work site based on at least the image data. The object module is configured to identify at least a first object in the image and to abstract the first object as object symbology. The map module is configured to generate a work site map with the object symbology layered onto the scene image.

In another aspect, the disclosure provides a method of generating a work site map. The method includes receiving, with a communication component, image data representing at least one image of a work site captured by an imaging apparatus of an unmanned aerial device; evaluating, with a controller, the image data and generating a scene image of the work site based on at least the image data; identifying, with the controller, at least a first object in the work site from the image data; abstracting, with the controller, the first object to generate object symbology; and generating, with the controller, the work site map by layering the object symbology onto the scene image.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art.

The following describes one or more example implementations of the disclosed monitoring systems and methods for a work site, as shown in the accompanying figures of the drawings described briefly above. Generally, the disclosed systems and methods operate to generate work site maps based on aerial images for various operators that provide for improved efficiency, operation, and safety as compared to conventional systems.

Figure 1:
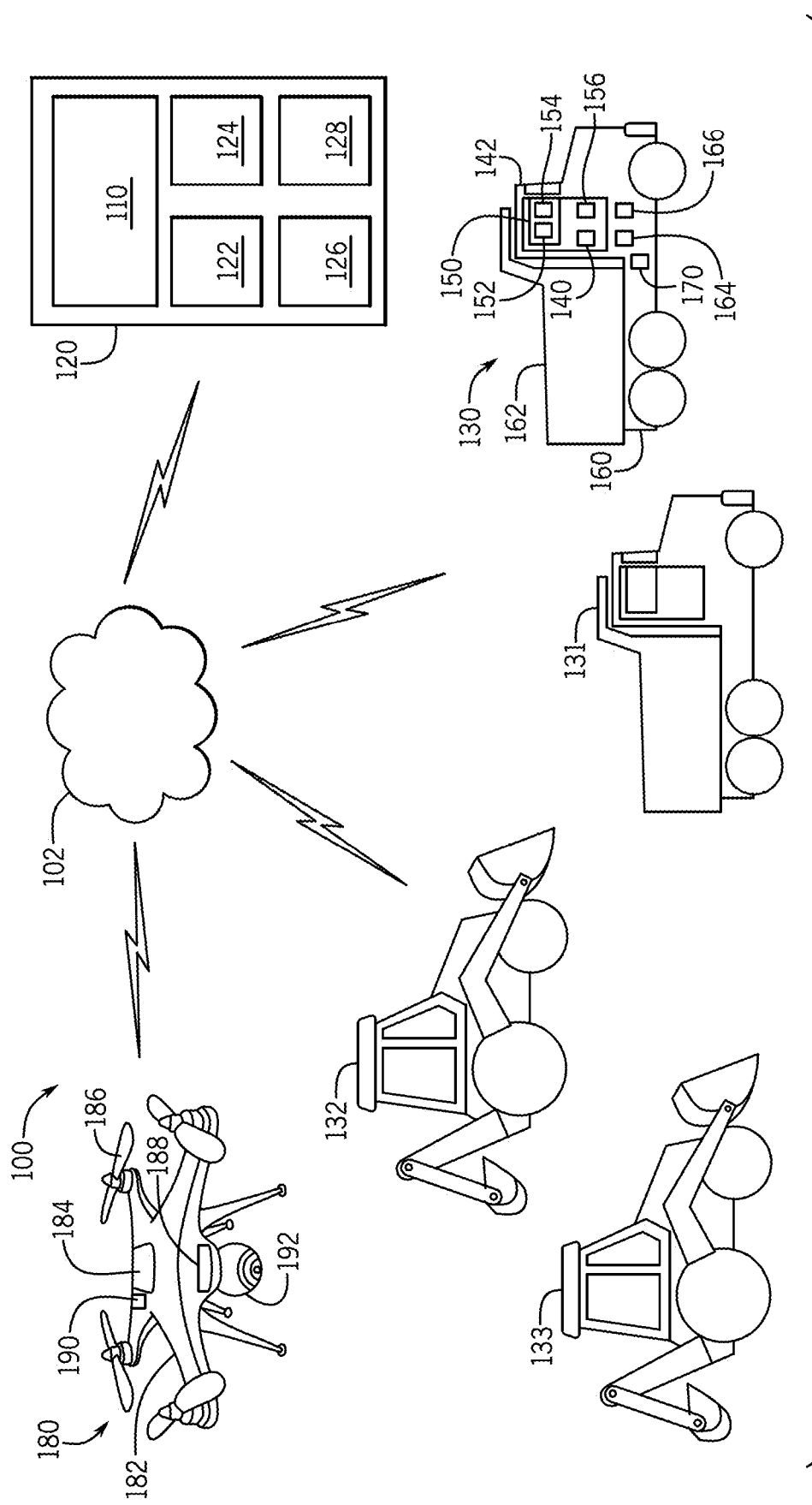
FIG. 1 is a schematic view of an example environment in which the disclosed monitoring system and method may be associated.

FIG. 1 is an example work site environment (or "work site") 100 in which a monitoring system and method may be implemented. In one embodiment, a monitoring system 110 may be implemented in, or associated with, a control center 120 of a work site 100 having one or more work vehicles 130, 131, 132, 133. As described below, the monitoring system 110 may generate work site maps based on images captured by one or more unmanned aerial devices 180. Although depicted in control center 120, in various embodiments, the monitoring system 110 may be implemented with and/or otherwise interact with other elements within or outside of the work site 100, including the various vehicles 130-133 and unmanned aerial devices 180. In other examples, the monitoring system 110 may be a distributed system and/or a stand-alone system.

Generally, the work site 100 may be considered a geographical area in which the work vehicles 130-133 cooperate to perform one or more tasks that make up one or more overall jobs. The control center 120 may be on-site or off-site of the work site 100, and among other functions, implement the monitoring system 110 to generate work site maps for use by operators within the work vehicles 130-133 or by an operator in the control center 120 to monitor operation of the work vehicles 130-133 or one or more tasks at the work site 100. The work site maps of the monitoring system 110 may provide various types of information to the operators, such as task or job progress, abstracted work site information, work site images, mapping information, and/or status information regarding the work site 100 or the vehicles 130-133. The monitoring system 110 is discussed below with reference to an operator, which generically refers to the manager or operator within the control center 120, the operator within one or more or the work vehicles 130-133, or any party that requests or receives a work site map or facilitates generation of the work site map by the system 100.

The elements within the work site 100 may wirelessly communicate with one another in any suitable manner, including directly (e.g., via Bluetooth®, radio frequency signals, or the like) or via network 102. For example, the communication network 102 may utilize one or more of various communication techniques or mechanisms, including radio frequency, Wi-Fi, cellular, or the like. Further details about communication standards are provided below. The network 102 may include or otherwise cooperate with the JDLink™ system commercially available from Deere & Company of Moline, Ill.

As introduced above, the work vehicles 130-133 may be part of an overall fleet or any collection of vehicles. Although four vehicles 130-133 are shown in FIG. 1 as examples, any number may be provided. The work vehicles 130-133 may be any type of work vehicle (either the same type or different types), including the articulated dump trucks 130, 131 and backhoe loaders 132, 133 depicted in FIG. 1. In other applications, other configurations are also possible. For example, work vehicles in some embodiments may be configured as haulers, graders, or similar vehicles. Further, work vehicles may be configured as machines other than construction machines, including vehicles from the agriculture, forestry and mining industries, such as tractors, combines, harvesters, yarders, skylines, feller bunchers, and so on. Additional details about the work vehicles 130-133 and unmanned aerial device 180, as well as operation of the monitoring system 110, will be provided below after a description of the control center 120.

Generally, the control center 120 includes a communication component 122, a center controller 124, one or more data stores 126, and a human-machine interface 128 that implement or otherwise facilitate the monitoring system 110. The communication component 122 comprises any suitable system for receiving data from and transmitting data to the work vehicles 130-133 and unmanned aerial device 180. For example, the communication component 122 may include a radio or suitable receiver configured to receive data transmitted by modulating a radio frequency (RF) signal via a cellular telephone network according to the long-term evolution (LTE) standard, although other techniques may be used. The communication component 122 may achieve bi-directional communications over Bluetooth® or by utilizing a Wi-Fi standard, i.e., one or more of the 802.11 standards as defined by the Institute of Electrical and Electronics Engineers ("IEEE"), as is well known to those skilled in the art. Thus, the communication component 122 may include a Bluetooth® transceiver, a radio transceiver, a cellular transceiver, an LTE transceiver and/or a Wi-Fi transceiver. The communication component 122 may employ various security protocols and techniques to ensure that appropriately secure communication takes place between control center 120, the work vehicles 130-133, and the unmanned aerial device 180.

The center controller 124 is in communication with the communication component 122, the data store 126, and/or the human-machine interface 128 over a suitable interconnection architecture or arrangement that facilitates transfer of data, commands, power, etc. In some embodiments, the center controller 124 may also be in communication with one or more remote operators via a portal, such as a web-based portal. The center controller 124 may be configured as a computing device with associated processor devices and memory architectures, as a hard-wired computing circuit (or circuits), as a programmable circuit, or otherwise.

In some examples, the human-machine interface 128 enables an operator to interface with the control center 120 (e.g. to input commands and data), and thus, other elements within the work site 100. In one example, the interface 128 includes an input device and a display. The input device is any suitable device capable of receiving user input, including, but not limited to, a keyboard, a microphone, a touchscreen layer associated with the display, or other suitable device to receive data and/or commands from the user. Multiple input devices can also be utilized. The display comprises any suitable technology for displaying information, including, but not limited to, a liquid crystal display (LCD), light emitting diode (LED), organic light emitting diode (OLED), plasma, or a cathode ray tube (CRT). In some embodiments, the interface 128 may include output devices in addition to the display, including speakers and haptic actuators.

Generally, the control center 120 receives and stores data from the work vehicles 130-133 and unmanned aerial device 180, as well as from similar machines, devices, and systems from across a fleet or workforce. In some examples, the control center 120 may operate as "backend" system or server that facilities operation within a work site or a group of work sites, including the collection and creation of various types of data, such as fleet data, service data, job or planning data, personnel data, and the like. Additionally, in one embodiment, the control center 120 may implement one or more aspects of the monitoring system 110, including providing requested or desired data for carrying out the associated functions discussed in greater detail below.

As noted above, a monitoring system 110 may be utilized with regard to various mobile work vehicles and other types of mobile machines, including the depicted work vehicles 130-133 of FIG. 1. In the depicted embodiment, the work vehicles 130-133 correspond to articulated dump trucks 130-131 and backhoe loaders 132-133, although any type of vehicle may be provided. Among other uses, the articulated dump trucks 130-131 are generally utilized for transporting material into, out of, or within the work site 100, and the backhoe loaders 132-133 may be used to dig material, push material, or load material into or out of the dump trucks 130-131.

One of the work vehicles 130 is described below to provide an example of the various types of machine elements that may interact with the monitoring system 110 and are described merely as reference. Unless otherwise noted, the vehicles 131-133 have components analogous to those discussed below in reference to vehicle 130.

In one example, the work vehicle 130 includes a vehicle controller 140 (or multiple controllers) to control various aspects of the operation of the work vehicle 130, and in some embodiments, facilitate implementation of the monitoring system 110. Generally, the controller 140 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 140 may be configured to execute various computational and control functionality with respect to the work vehicle 130 (or other machinery). In some embodiments, the controller 140 may be configured to receive input signals in various formats (e.g., as hydraulic signals, voltage signals, current signals, and so on), and to output command signals in various formats (e.g., as hydraulic signals, voltage signals, current signals, mechanical movements, and so on).

The controller 140 may be in electronic, hydraulic, mechanical, or other communication with various other systems or devices of the work vehicle 130 (or other machinery). For example, the controller 140 may be in electronic or hydraulic communication with various actuators, sensors, and other devices within (or outside of) the work vehicle 130, including various devices described below. The controller 140 may communicate with other systems or devices (including other controllers) in various known ways, including via a CAN bus (not shown) of the work vehicle 130, via wireless or hydraulic communication means, or otherwise.

In some embodiments, the controller 140 may be configured to receive input commands and to interface with an operator via a human-vehicle interface 150, which may be disposed inside a cab 142 of the work vehicle 130 for easy access by the vehicle operator. The human-vehicle interface 150 may be configured in a variety of ways. In some embodiments, the human-vehicle interface 150 may include an input device 152 with one or more joysticks, various switches or levers, one or more buttons, a touchscreen interface that may be overlaid on a display 154, a keyboard, a speaker, a microphone associated with a speech recognition system, or various other human-machine interface devices. The human-vehicle interface 150 also includes the display 154, which can be implemented as a flat panel display or other display type that is integrated with an instrument panel or console of the work vehicle 130. Those skilled in the art may realize other techniques to implement the display 154 in the work vehicle 130. As described in greater detail below, the display 154 may function to render the work site map generated by the monitoring system 110 for display to the operator of the vehicle 130.

The work vehicle 130 further includes a vehicle communication component 156. The vehicle communication component 156 enables communication between the controller 140 and the monitoring system 110, as well as other elements associated with the work site 100. The vehicle communication component 156 comprises any suitable system for receiving and transmitting data, including those described above with reference to the communication component 122. In one example, the vehicle communication component 156 achieves bi-directional communications with the monitoring system 110 over Bluetooth®, satellite or by utilizing a Wi-Fi standard, i.e., one or more of the 802.11 standards. The vehicle communication component 156 may employ various security protocols and techniques to ensure appropriately secure communication.

As described in greater detail below, the controller 140 may facilitate the collection of various types of vehicle data associated with the work vehicle 130 for the monitoring system 110. The vehicle data may be in the form of raw data from the applicable sensors described below (or other sources) or undergo some processing in the controller 140 in order to extract the desired characteristics. As examples, such data may include position data and status data. The controller 140 may also facilitate the receipt of the work site maps from the monitoring system 110, e.g., via the vehicle communication component 156, and the display of the maps on the display 154. Further details will be provided below.

As introduced above, the work vehicle 130 includes a vehicle frame 160 supporting the cab 142. In this example, the work vehicle 130 is a dump truck and includes a work tool in the form of a load bin 162 mounted to the vehicle frame 160. It will be understood that the configuration of the work vehicle 130 having a work tool as the load bin 162 is presented as an example only. The load bin 162 defines a receptacle to receive a payload. Typically, one or more actuatable hydraulic cylinders are mounted to the frame 160 and the load bin 162 to selectively pivot the load bin 162 about a pivot point. In other embodiments, work tools may include blades, forks, tillers, and mowers, as examples.

Like work vehicle 130, work vehicle 131 is also an articulated dump truck and has a similar load bin as a work tool. In contrast, the work vehicles 132, 133 are implemented as backhoe loaders in which the work tools are formed by a loader mounted on the front of the vehicle 132, 133 and a digging bucket on an articulated arm mounted on the back of the vehicle 132, 133.

The work vehicle 130 further includes a source of propulsion, such as an engine 164 that supplies power to a transmission 166. In one example, the engine 164 is an internal combustion engine, such as a diesel engine, that is controlled by the controller 140. It should be noted that the use of an internal combustion engine is merely an example, as the propulsion device can be a fuel cell, an electric motor, a hybrid-gas electric motor, etc. The transmission 166 transfers the power from the engine 164 to a suitable driveline coupled to one or more driven wheels (or other type of traction mechanism) of the work vehicle 130 to enable movement. As is known to one skilled in the art, the transmission 166 may include a suitable gear transmission operated in a variety of ranges containing one or more gears, including, but not limited to a park range, a neutral range, a reverse range, a drive range, a low range, etc.

The work vehicle 130 may include various other components or systems that are typical on work vehicles. Examples include actuation systems for the load bin 162 and/or other components; lubrication and cooling systems; battery systems; exhaust treatment systems; power steering systems; braking systems; and the like.

The work vehicle 130 further includes various sensors 170 that function to collect information about the work vehicle 130 and/or the work site 100. Such information may be provided to the controller 140 and/or the communication component 156 for potential transmission and use by the monitoring system 110.

As examples, the sensors 170 may include operational sensors associated with the vehicle systems and components discussed above, including engine and transmission sensors, fuel sensors, and battery sensors. Additional sensors 170 may include components used to determine the orientation, position, or status of the work tool, including determining the mass or volume of material within the work tool. Sensors 170 may also be provided to observe various conditions associated with the work vehicle 130. For example, various sensors 170 may be disposed on or near the frame 160 in order to measure position parameters, such as an incline or slope of the vehicle 130. Additionally, the work vehicle sensors 170 may include one or more speed, location, and/or position sensors, such as a global positioning system (GPS) receiver, a LORAN system, a dead reckoning system, a cellular triangulation system, or other positioning system, that provide signals to the controller 140 to ascertain the speed, location, and/or heading of the work vehicle 130. It should be noted that, as used herein, the term "GPS" refers to any type of satellite-based positioning system. Additionally, the kinematic information (e.g., location, speed, orientation, direction of travel, incline, etc.) associated with the work site element (e.g., work vehicle 130) may be generically referred to as "position" data. The sensors 170 may further include one or more proximity sensors arranged to identify the presence or absence of objects surrounding the work vehicle 130, including optical sensors, infrared sensors, and radar or LIDAR systems. In some instances, the sensors 170 and/or controller 140 may form health or condition monitoring systems that generate diagnostic trouble codes as status (or health) data associated with the work vehicles 130-133 that may be provided to the monitoring system 110. As described in greater detail below, the controller 140 may operate to send various types of information, such as position and status information, to the monitoring system 110 as vehicle data. Further the monitoring system 110 may provide work site maps to the work vehicles 130-133 for display to the vehicle operator.

As introduced above, the monitoring system 110 may also include or interact with one or more unmanned aerial devices 180. Generally, the unmanned aerial device 180 is any type of powered, aerial vehicle that does not carry a human operator and uses aerodynamic forces to fly based on commands generated autonomously or received from a remote pilot. The unmanned aerial device 180 may also be referred to as an unmanned aerial vehicle (UAV), a drone, or an unmanned aircraft system (UAS). Although only one device 180 is depicted, additional devices 180 may be provided to cooperatively and collectively capture images of the work site 100.

As described below, in one example, the unmanned aerial device 180 operates to fly autonomously over the work site 100 based on a flight plan. Such flight plans may be based on predetermined or recognized work site boundaries. In other examples, the unmanned aerial device 180 may be manually piloted or operate semi-autonomously. Further, a single unmanned aerial device 180 may cover a complete work site 100 at a particular interval, while in other embodiments, multiple unmanned aerial devices 180 are provided to collectively cover the work site 100 over a particular interval. Such intervals or "passes" may be based on a number of considerations, including the size and level of activity at the work site 100. Generally, however, the work sites maps generated by the monitoring system 110 are based on real-time, current, or relatively recent images captured by the unmanned aerial device 180. Although some elements of the unmanned aerial device 180 are specifically discussed below, the device 180 may include additional components or functionality.

In one embodiment, the unmanned aerial device 180 includes a body 182 that generally houses or otherwise supports the other components of the device 180. The unmanned aerial device 180 further includes flight actuators 186 that collectively include one or more of rotors, motor, engine, wings, adjustable flight control surfaces, and the like that enable the device 180 to achieve and maintain flight as desired.

The unmanned aerial device 180 further includes a controller 184 that controls overall operation of the device 180, including flight control and image capture. For example, the controller 184 may be configured as a computing device with associated processing devices and memory architectures, as a hard-wired computing circuit (or circuits), as a programmable circuit, or otherwise.

Further, one or more sensors 188 may be provided to collect information that may be used for flight control and/or image collection. For example, the sensors 188 may include one or more speed, location, and/or position sensors, such as a GPS receiver, a LORAN system, a dead reckoning system, a cellular triangulation system, or other positioning system, to enable determination the speed, location, and/or position of the device 180. In accordance with an embodiment, sensors 188 may also include inertial measurement units (IMU) 240 for generating or supplementing location data, which may include various components, such as accelerometers, gyroscopes, tilt sensors, etc. Additionally, the sensors 188 may optical sensors, infrared sensors, and radar or LIDAR systems that may assist in flight control or in the collection of images and other data about the work site 100.

The unmanned aerial device 180 further includes a communication unit 190 that enables the controller 184 and/or other components of the device 180 to communicate with a ground station, which in one example is the control center 120, and/or with the monitoring system 110. The communication unit 190 comprises any suitable system for receiving and transmitting data, including those described above with reference to the communication component 122. In one example, the communication unit 190 achieves bi-directional communications over Bluetooth®, satellite or by utilizing a Wi-Fi standard, i.e., one or more of the 802.11 standards. The communication unit 190 may employ various security protocols and techniques to ensure appropriately secure communication.

The unmanned aerial device 180 further includes an imaging apparatus 192. The imaging apparatus 192 functions to collect images of the work site 100. The imaging apparatus 192 may include one or more of a general still camera, a video camera having a video recording function, a stereoscopic camera capable of obtaining a three-dimensional image using parallax, a 360 degree camera capable of obtaining 360 degree video, a hyper-spectrum camera, and/or a thermal imaging device. In some examples, the images may be used to collect or determine real-time contour, topology, elevation and other information with respect to the work site 100. Such images may include multispectral and/or hyperspectral images, for example, to facilitate the generation of three-dimensional (3D) mapping information. Generally, the imaging apparatus 192 operators to capture a sufficient number of images required to generate the work site map discussed below. In some embodiments, the unmanned aerial device 180 may include a servo-motor that enables adjustment or repositioning of the imaging apparatus 192.

As introduced above, the controller 184 may include any suitable hardware and software to generate the images that facilitate the creation of the work site maps discussed below. For example, the controller 184 generates the flight control commands to result in the device 180 being in the appropriate position at the appropriate time to capture the desired images within the designated interval, which may include the entire work site if the device 180 is a single device or a specified position if the device 180 is one of a number of cooperating devices. When multiple devices 180 are provided, the controller 184 of a respective device 180 may facilitate communication with corresponding controllers of other devices to sync or coordinate image collection. In some embodiments, the controller 184 may perform some level of image processing, including combining and/or stitching together multiple partial images into a complete image, although typically, this function is performed off-board the device 180. In any event, the images captured by the device 180 are transmitted by the communication unit 190 to the monitoring system 110, as described in greater detail below.

Figure 2:
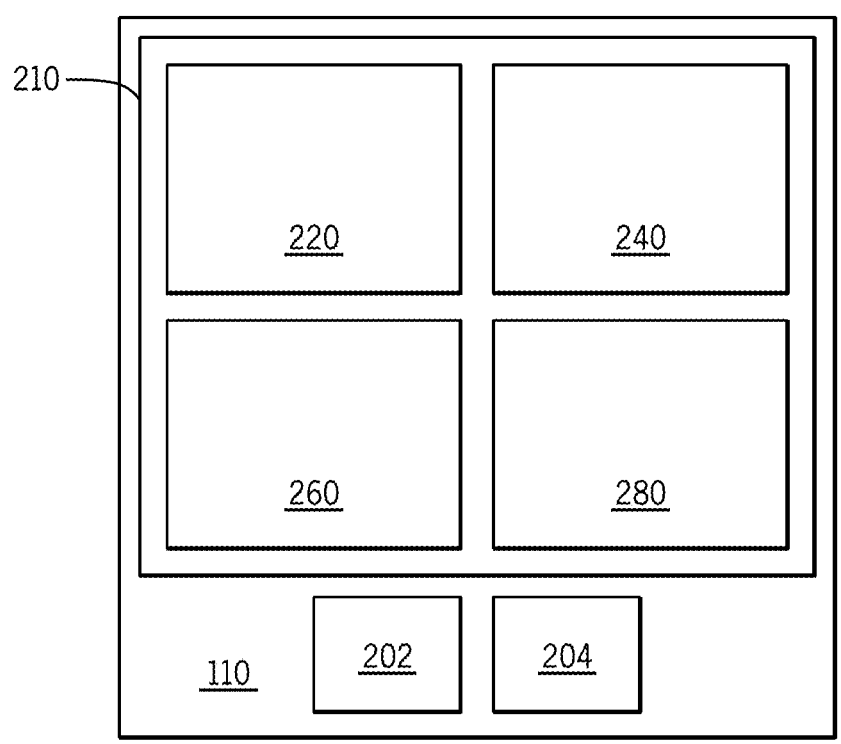
FIG. 2 is a schematic block diagram of an example work site monitoring system.

FIG. 2 is a simplified block diagram of the monitoring system 110. As described above, the monitoring system 110 may be implemented with the components of the control center 120 (e.g., the communication component 122, center controller 124, data store 126, and human-machine interface 128) such that, in effect, the monitoring system 110 may be considered part of the control center 120. However, in other examples, the monitoring system 110 may have analogous dedicated components.

The monitoring system 110 may be considered to include a controller 210 that may be organized as one or more functional units or modules 220, 240, 260, and 280 (e.g., software, hardware, or combinations thereof). As an example, each of the modules 220, 240, 260, 280 may be implemented with processing architecture such as a processor 202 and memory 204. For example, the controller 210 may implement the modules 220, 240, 260, 280 with the processor 202 based on programs or instructions stored in memory 204.

In the depicted embodiment, the controller 210 of the monitoring system 110 includes a scene module 220, an object module 240, a productivity module 260, and a map module 280. FIG. 2 depicts one exemplary organization, and other embodiments may perform similar functions with alternative organization or implementation. Additional details about operation of these modules 220, 240, 260, 280 will be provided below.

As introduced above, the monitoring system 110 may receive data from one or more data sources. As examples, and as discussed in greater detail below, such data sources may include the unmanned aerial device 180, work vehicles 130-133, data store 126, user inputs, and/or other systems. As also discussed below, the monitoring system 110 uses this data to generate work site maps and other types of information associated with the work site 100 to enable an operator to monitor various work site characteristics.

Figure 3:
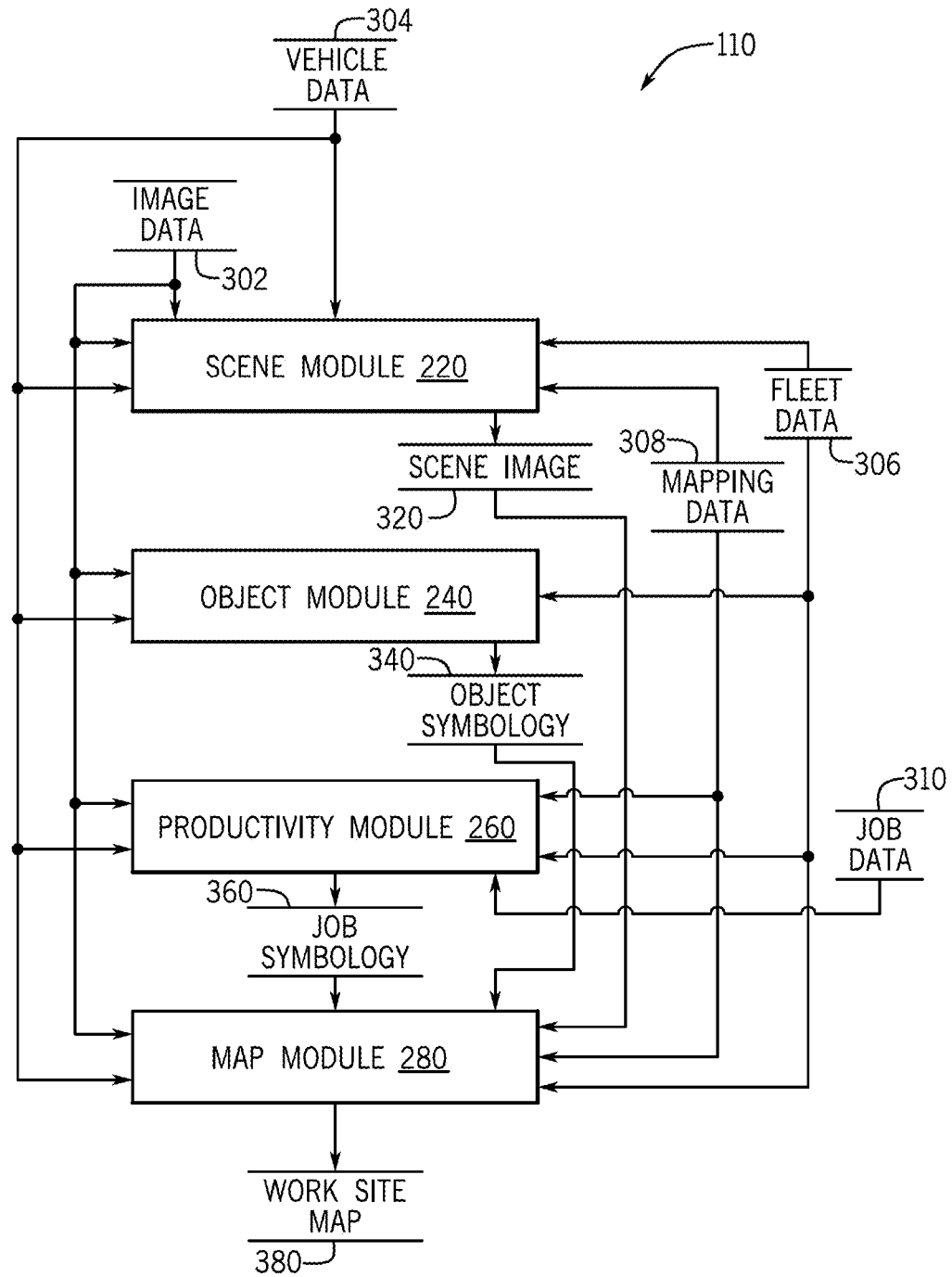
FIG. 3 is a more detailed schematic block diagram of the example work site monitoring system of FIG. 2.

FIG. 3 is a more detailed schematic block diagram that depicts the data flows in and out of the system 110 and between the modules 220, 240, 260, 280. The data flows and organization depicted in FIG. 3 are merely examples, and other mechanisms for performing similar functions may be provided, certain functions may be omitted, and additional functions may be added. Aspects of FIG. 1 may be referenced below in the discussion of FIG. 3.

In one example, the scene module 220 operates to generate a scene image 320 that depicts the "scene" of the work site 100, which generally refers to the overall background of the work site, including the terrain and/or task areas. The scene module 220 may receive data from a number of sources, including unmanned aerial device 180, work vehicles 130-133, data store 126, user inputs, and/or other systems.

In particular, the scene module 220 receives image data 302 from one or more of the unmanned aerial devices 180. As introduced above, the image data 302 may take various forms, although generally, the image data 302 collectively represents an overall aerial (or "bird's eye") view of the work site 100. The image data 302 may be formed by multiple, partial images of the work site 100; a single image of the work site 100; and/or video or other types of images of the work site 100 from which visual images and/or other types of data may be extracted. As described below, the image data 302 may be evaluated, sorted, and combined to create an overall scene image 320.

In some examples, the image data 302 may be associated with, or include, time data that indicates the time at which the respective image was captured and/or position data that indicates the location, altitude, speed, orientation and the like of the unmanned aerial device 180 when the respective image was captured. This data may be used as context for the creation of the scene image 320 from multiple images. For example, based on the time and/or position of the unmanned aerial device 180 and the characteristics of the imaging apparatus 192 (e.g., field of view, angle, etc.), geographical coordinates for the resulting image may be estimated or determined.

In some examples, the scene module 220 may additionally receive vehicle data 304 directly from one or more of the work vehicles 130-133 or accessed from data store 126. The vehicle data 304 may include position data in the form of location, speed, and/or heading associated with one or more of the vehicles 130-133 at the work site 100. In some embodiments, the vehicle data 304 may be supplemented with fleet data 306 stored in data store 126 representing the number, type, and other characteristics of work vehicles within the fleet. This data 304, 306 may assist the scene module 220 in the generation of the scene image 320. For example, if a vehicle 130-133 with a known location from position data in the vehicle data 304 is identified in the image data 302, the scene module 220 may use this information to assign or estimate coordinates for the surrounding scene portion or for matching adjacent images. Additional examples may be discussed below.

In some examples, the scene module 220 may also receive mapping data 308 stored in data store 126. The mapping data 308 may include information about the geography, terrain, landmarks, and the like within the work site 100. This data, which may include previously generated work site maps and/or scene images, may enable more efficient generation of new or updated scene images.

Upon receipt of the image data 302 (and optionally, other types of data 304, 306, 308), the scene module 220 may generate the scene image 320 of the work site 100. As noted above, in one example, the scene module 220 stitches or otherwise combines multiple images from the image data 302 into an overall, comprehensive scene image 320 of the work site 100.

Generally, scene stitching of multiple images may be performed in various ways. For example, stitching may be performed using purely visual information from the image data 302, or using visual information from the image data 302 combined with position and time data associated with the image data 302 provided by the imaging apparatus 192. For example, as matching image portions are recognized and stitched together, the position and time data of the image data 302 may contain information that functions to provide an initial estimate for the alignment of multiple images, while in other examples, the position and time data may be used directly to calculate the alignment of multiple images.

In any event, the scene module 220 may evaluate the images to identify portions of different images that depict the same scene portions of the work site 100. In particular, the scene module 220 may relate pixel coordinates in a respective image to pixel coordinates in other images for alignment in order to match image portions of relative pairs or collections of images. Further, distinctive features within each image may be identified to determine image correspondence between pairs or groups of images. In some examples, mapping data 308 with known characteristics of distinctive features may be used to align respective images. Further, the images may be projected and aligned onto a generated compositing surface, which further enables the blending of overlapping images, including accounting for differences in lighting, parallax, motion, lens distortion, and exposure.

In some examples, the scene module 220 may additionally use vehicle data 304 and fleet data 306 to facilitate the stitching and/or abstraction of the work site scene image 320. For example, the scene module 220 may use the position, heading, and speed information of one or more of the work vehicles 130-133 to facilitate image matching, and/or such data may be used to avoid artifacts that may otherwise result from the motion of such a vehicle.

Although discussed with reference to the monitoring system 110 implemented in the control center 120, in one example, some or all of the stitching function may be performed on-board the unmanned aerial device 180. In particular, the scene module 220 may receive the image data 302 as a complete view of the work site for generation of the scene image 320.

In some examples, the scene module 220 may further subject one or more characteristics of the scene image 320 to some amount of abstraction. Generally, "abstraction" may be considered the selection and generalization of features within the image, and further, the classification, simplification, exaggeration, symbolization, and induction of such features. For example, roads, areas, and boundaries of interest within the image may be identified and emphasized or labeled within the scene image 320. The abstraction may be based on mapping data 308 or job data 310 stored in data store 126. For example, a road may be identified or recognized within a scene image and confirmed or supplemented with data 306, 308, such that the image of the road may be replaced or covered with symbology representing the road and/or text symbology with the name of the road. In other embodiments, upon correlating image pixels to geographical coordinates, the geographical coordinates associated with elements of interest within data 306, 308 may be used to generate and position the corresponding symbology within the scene image 320. Additional examples are discussed below.

Accordingly, the scene module 220 generates the scene image 320 that provides an overall comprehensive image of the work site 100, and in one example, may additionally include some level of abstraction. Additional details regarding the scene image 320 are discussed below.

As noted above, the monitoring system 110 further includes the object module 240. In one example, the object module 240 functions to generate object symbology 340 associated with objects within the work site 100. Generally, the "objects" correspond to the work vehicles 130-133 and other equipment within the work site 100. The "objects" may also include materials, supplies, and resources within the work site 100. Additional examples may be discussed below.

The object module 240 may receive one or more of the image data 302, vehicle data 304, fleet data 306, and mapping data 308. Generally, the object module 240 functions to identify, classify, evaluate, and/or abstract one or more of the objects within the work site 100.

As an example, object module 240 may use image recognition to identify the work vehicles 130-133 within the images of work site from the image data 302. In particular, the object module 240 may identify the position (e.g., location, heading, and orientation) of the vehicles 130-133. This function may be facilitated by the one or more of the vehicle data 304 and fleet data 306, e.g., based on the reported and/or expected characteristics of each vehicle 130-133. In some examples, the object module 240 may use image recognition to identify objects other than the work vehicles in the work site 100, such as errant vehicles or personnel. As described below, over time, the objects identified by the object module 240 may be tracked to provide additional information incorporated into the object symbology 340.

Upon identification of the objects, the object module 240 may classify the object, e.g., by determining the type and/or purpose of the object within the work site 100. For example, the object module 240 may determine or recognize that work vehicles 130, 131 are articulated dump trucks and work vehicles 132, 133 are backhoe loaders. In some examples, the object module 240 may also classify the current status of the object, particularly the work vehicles 130-133. For example, the object module 240 may determine the presence or amount of material or load within the work tool of the work vehicle 130-133, or the object module 240 may determine that the work vehicle 130-133 is traveling to a particular location or away from a particular location. Such information may be derived from the image data 302 (e.g., as recognized in the images) and/or the vehicle data 304 (e.g., as reported by the respective vehicle). In further examples, the vehicle data 304, as reported by the vehicle 130-133, or fleet data 306, as reflected by service or maintenance records for the identified work vehicle 130-133, may include health information, such as diagnostic trouble codes. This health information may be used to evaluate the status or suitability of each vehicle 130-133.

Upon classification, the object module 240 may abstract one or more aspects of the objects and generate object symbology 340 based on this abstraction. For example, the object symbology 340 generated by the object module 240 may include simplified images or symbols associated with each object to highlight the object or enable more immediate visual recognition. Further, the object symbology 340 generated by the object module 240 may provide a symbolic representation of the status or other types of information associated with of the object. For example, the object symbology 340 may reflect the work vehicle type, the amount of material within the work vehicle 130-133, status of the work vehicle 130-133, and/or the movement of the work vehicle 130-133. The object symbology 340 may also reflect the determination that the object has been identified as being unauthorized or unrecognized as a work vehicle 130-133, as well as the movement of such objects over time. Typically, each element of the object symbology is associated with coordinate data representing the position of the respective element within the work site 100 and/or with respect to the scene image 320.

Accordingly, the object module 240 generates object symbology 340 representing the abstraction of the identified objects within the work site. As described in greater detail below, the object symbology 340 may be incorporated into the work site maps by replacing or masking the image portions of the scene image 320 corresponding to the respective real-world object.

Examples of the object symbology 340 are depicted in FIGS. 4A-4E and FIGS. 5A-5E. It should be noted that the examples of object symbology 340 in FIGS. 4A-4E and FIGS. 5A-5E are merely examples and other types of symbology may be used.

Figure 4A:
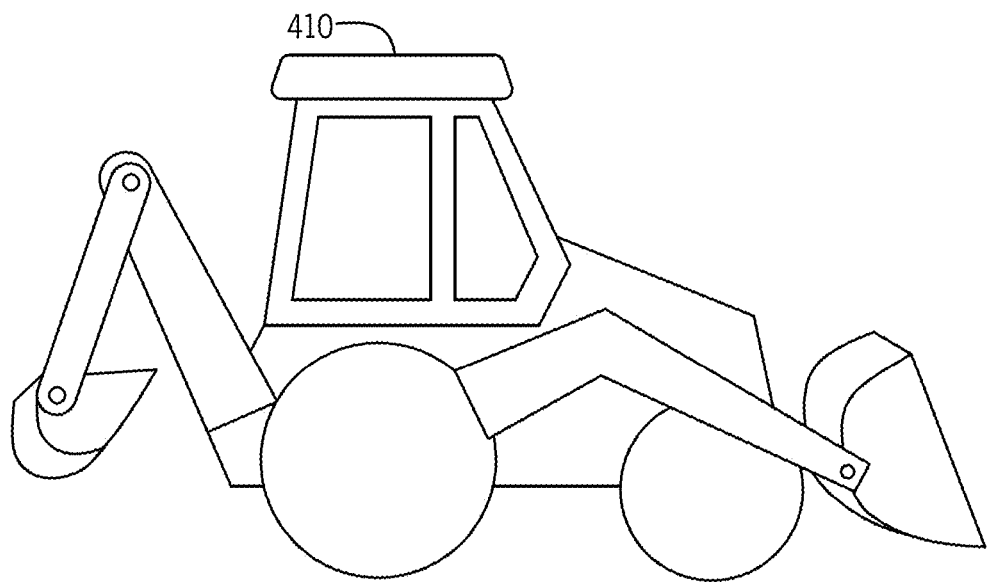
FIGS. 4A-4E and 5A-5E are examples of object symbology that may be used in the work site monitoring system of FIG. 3.

FIG. 4A is a line drawing symbol 410 that may be used to represent the work vehicle as a backhoe loader (e.g., work vehicle 132, 133). In one example, particularly as compared to the symbols discussed below, the backhoe loader symbol 410 of FIG. 4A is featureless or colorless, which may represent that the associated backhoe loader is idle, e.g., not currently moving or in use.

Figure 4B:
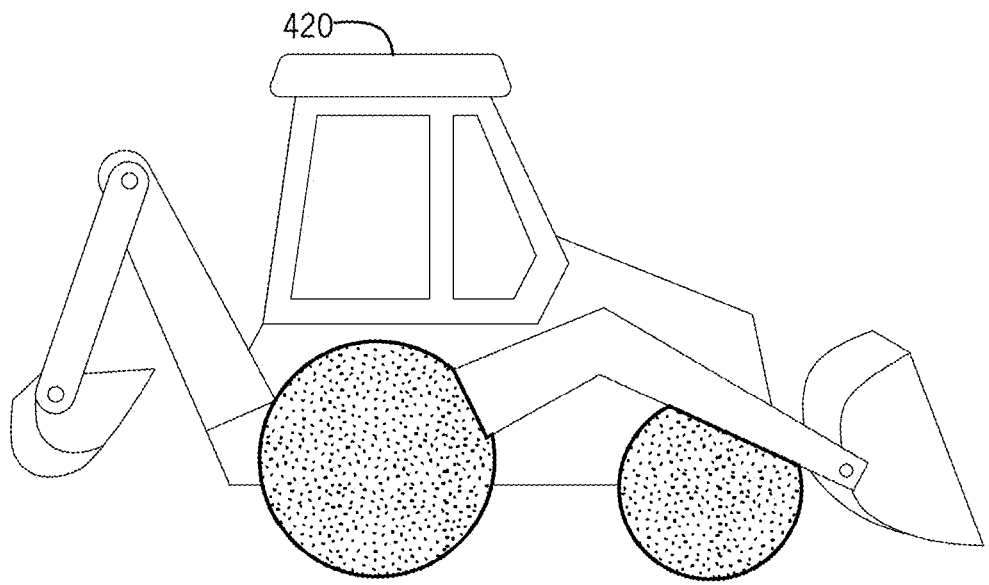

FIG. 4B is a line drawing symbol 420 that may be used to represent the work vehicle as a backhoe loader (e.g., work vehicle 132, 133). In this example, the backhoe loader symbol 420 has highlighted wheels (e.g., in a different color, brightness, etc.), which may represent that the associated backhoe loader is in motion from one position to another.

Figure 4C:
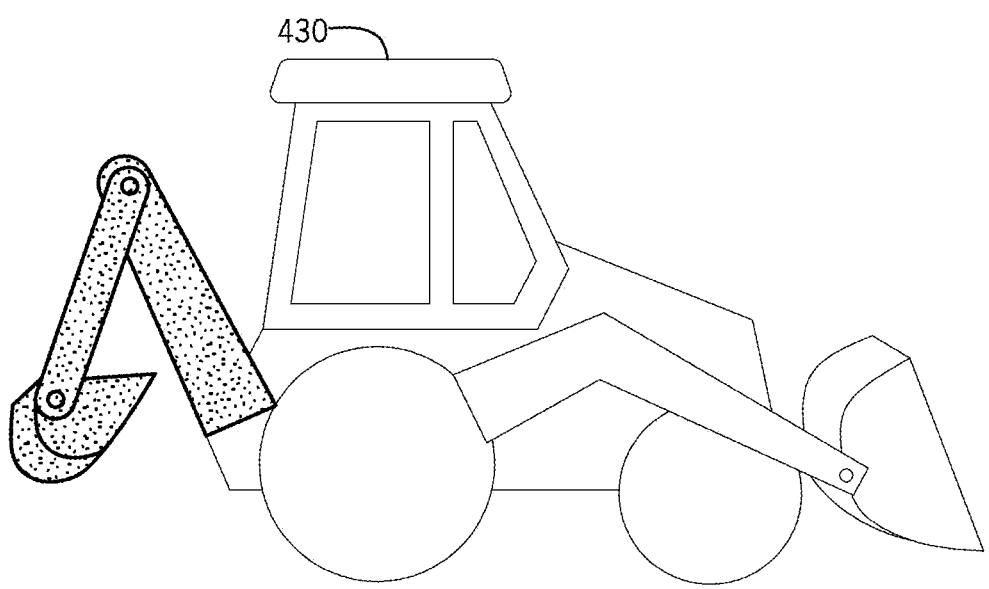

FIG. 4C is a line drawing symbol 430 that may be used to represent the work vehicle as a backhoe loader (e.g., work vehicle 132, 133). In this example, the backhoe loader symbol 430 has a highlighted backhoe tool (e.g., in a different color, brightness, etc.), which may represent that the backhoe tool of the associated backhoe loader is presently being used.

Figure 4D:
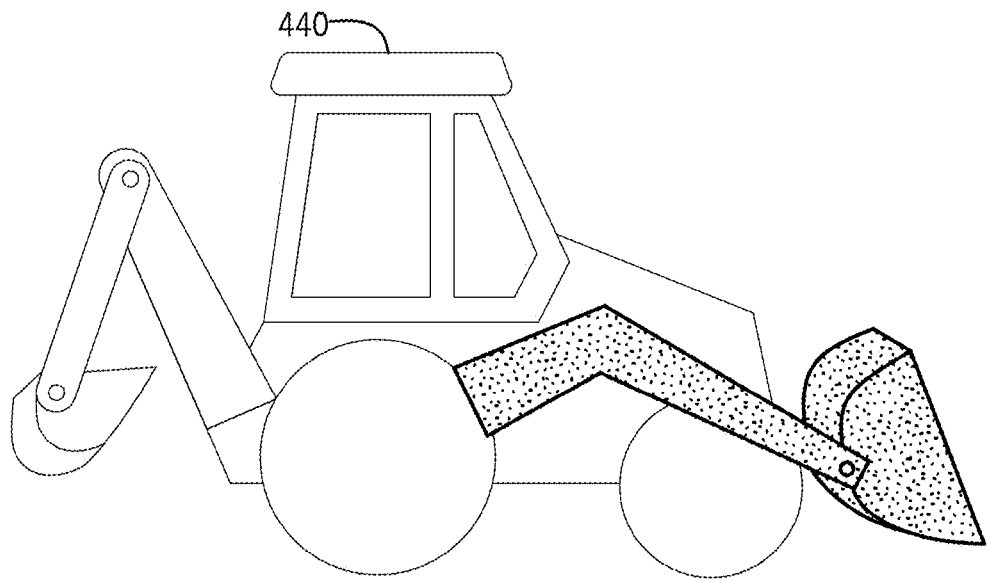

FIG. 4D is a line drawing symbol 440 that may be used to represent the work vehicle as a backhoe loader (e.g., work vehicle 132, 133). In this example, the backhoe loader symbol 440 has a highlighted loader tool (e.g., in a different color, brightness, etc.), which may represent that the loader tool of the associated backhoe loader is presently being used.

Figure 4E:
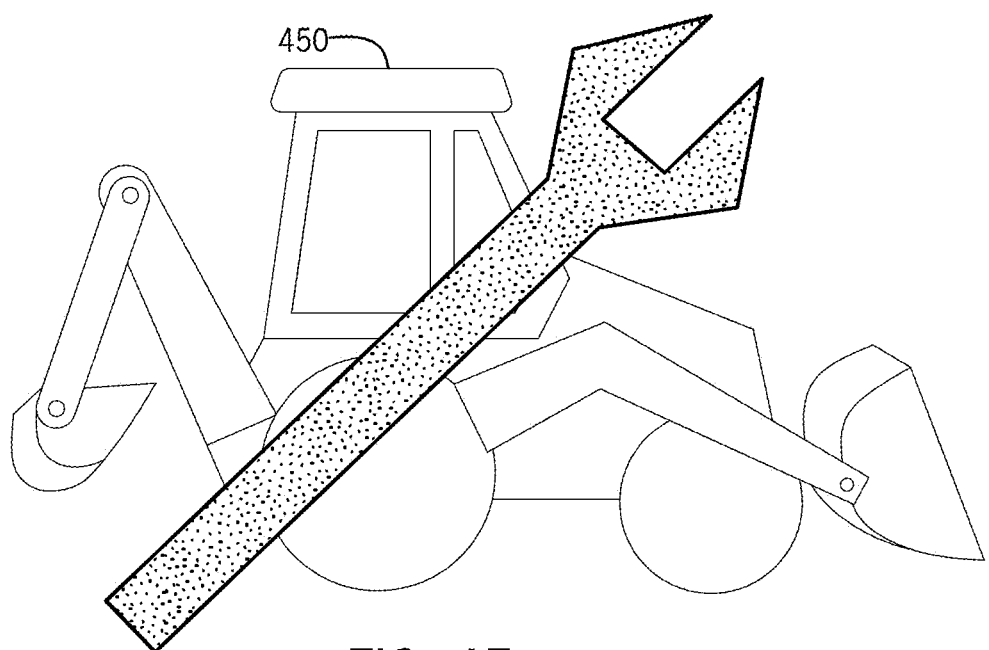

FIG. 4E is a line drawing symbol 450 that may be used to represent the work vehicle as a backhoe loader (e.g., work vehicle 132, 133). In this example, the backhoe loader symbol 450 is partially obscured by a wrench symbol, which may represent that associated backhoe loader requires maintenance. Such maintenance requirements may be indicated by the diagnostic trouble codes that may form part of the vehicle data 304 (FIG. 3).

Figure 5A:
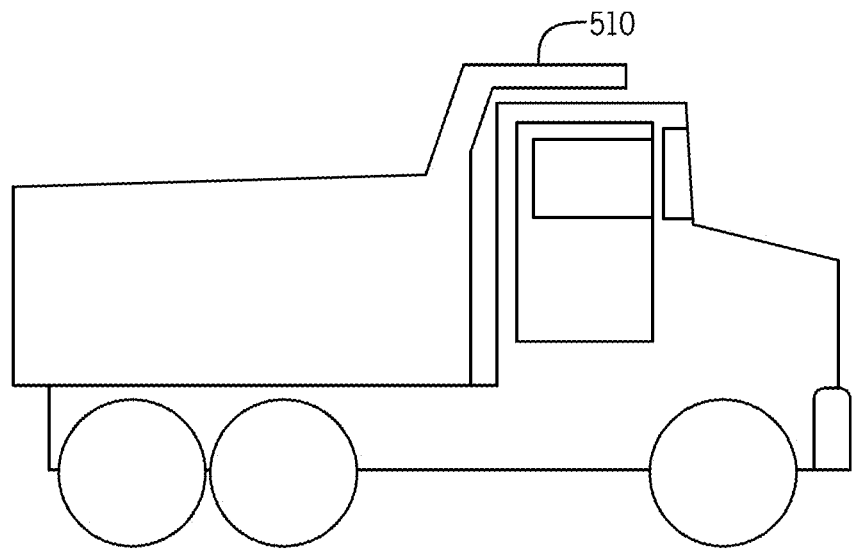

FIG. 5A is a line drawing symbol 510 that may be used to represent the work vehicle as an articulated dump truck (e.g., work vehicle 130, 131). In one example, particularly as compared to the symbols discussed below, the dump truck symbol 510 of FIG. 5A is featureless or colorless, which may represent that the associated truck is idle.

Figure 5B:
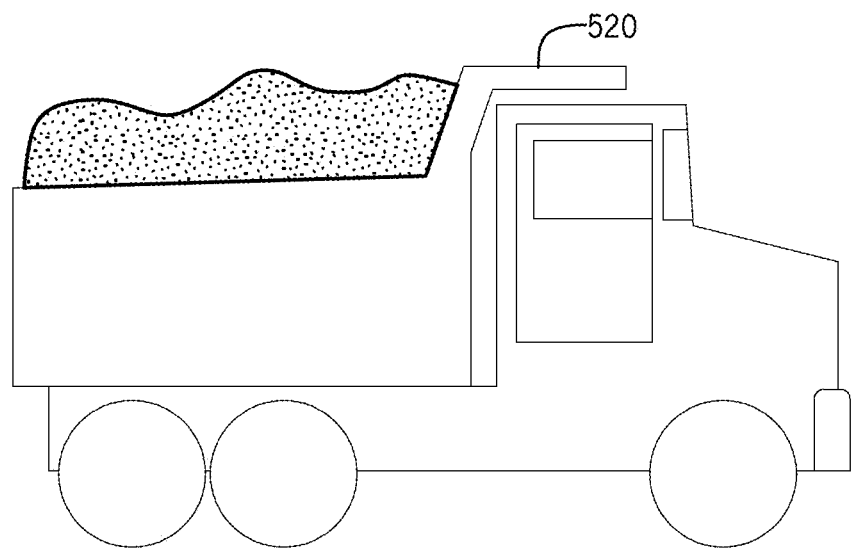

FIG. 5B is a line drawing symbol 520 that may be used to represent the work vehicle as an articulated dump truck (e.g., work vehicle 130, 131). In this example, the dump truck symbol 520 includes a load within the bin (e.g., in a different color, brightness, etc.), which may represent that the associated dump truck is loaded.

Figure 5C:
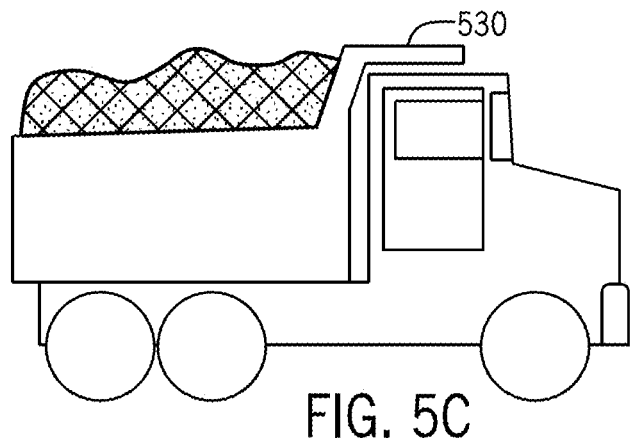
Figure 5D:
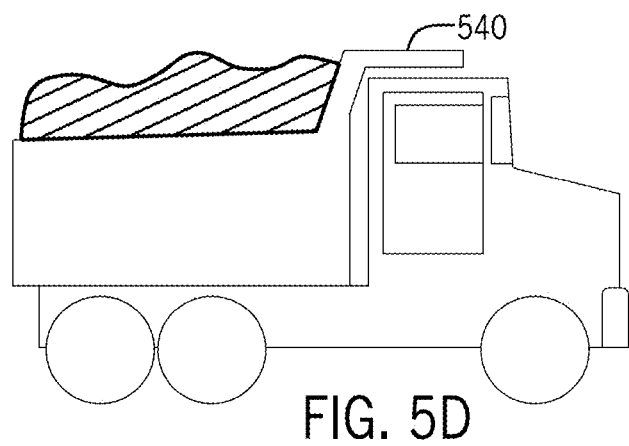
Figure 5E:
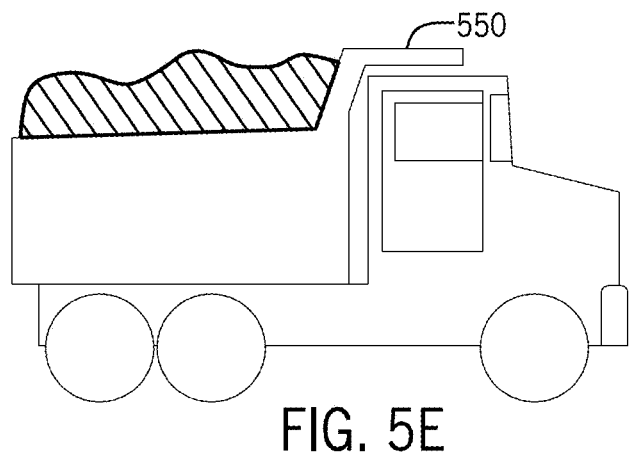

FIGS. 5C-5E are further examples of drawing symbols 530, 540, 550 that may be used to represent the work vehicle as an articulated dump truck (e.g., work vehicle 130, 131). Further to the example of FIG. 5B, the drawing symbols 530, 540, 550 of FIGS. 5C-5E include cross-hatching or colors on the load in the bin to represent the status of the associated dump truck and/or nature of the load. For example, cross-hatching of symbol 530 may indicate that the load is a particular kind of material. The cross-hatching of symbol 540 may indicate that the load is being transported to a first position, and the cross-hatching of symbol 550 may indicate that the load is being transported to a second position. Example uses of the object symbology represented in FIGS. 4A-4E and 5A-5E are discussed below.

Returning to FIG. 3, the monitoring system 110 further includes a productivity module 260. In one example, the productivity module 260 may receive one or more of the image data 302, vehicle data 304, mapping data 308, and job data 310. The job data 310 corresponds to planning information associated with the work site 100, such as a list or timeline of tasks to accomplish the overall job. The job data 310 may be provided by user input or accessed from the data store 126. As an example, the job data 310 may particularly provide context information for the task or jobs and may include productivity parameters, measurements, or milestones that are specific to the tasks being performed in the work site 100. As example, if the task is associated with a trench, the job data 310 may define a desired depth, length, or rate for a particular milestone or for completion. Another example may include the number or rate of material loads delivered or removed by the work vehicles 130-133 within the work site 100. The job data 310 may be updated as tasks or portions of tasks are completed. For example, as loads are delivered to a task area or removed from a task area (depending on the nature of the task area), the number of remaining loads reflected in the job data 310 may be adjusted accordingly. The job data 310 may further reflect data from loader payload scales, truck payload scales, or automated billing systems, as desired, to provide additional context information regarding the tasks at the work site 100.

Upon receipt of at least the image data 302 and the job data 310, the productivity module 260 evaluates the image data 302 to determine the progress associated with the tasks or job. In particular, the productivity module 260 may identify a task location within the images of the image data 302 and evaluate one or more characteristics of the task in view of the job data 310. Such characteristics may include the amount of material at the task location and/or the size of a building or structure at the task location, depending on the nature of the task. The productivity module 260 may then compare the observed characteristic within the images of the image data 302 to an anticipated or scheduled characteristic for the present time and/or a completed task from the job data 310. Examples are provided below.

In some embodiments, vehicle data 304 may be used by the productivity module 260 to identify the progress of task completion. For example, progress may be evaluated based the number of work vehicles 130-133 at a task area; whether the vehicles 130-133 are arriving or leaving the task area; and/or how many work vehicles 130-133 have arrived or left the task area.

In some embodiments, mapping data 308 may be used by the productivity module 260 to evaluate the task progress. For example, the productivity module 260 may compare the present images from the image data 302 to the most recent mapping data 308 in order to determine the discrepancies corresponding to task characteristics. Such discrepancies may be derived from comparing contour, topology, elevation, or other terrain information (e.g., to identify removed or added material) according to contour analysis techniques to evaluate terrain characteristics in the task area. The productivity module 260 may then evaluate the discrepancies in order to determine the amount of progress.

Upon evaluating one or more task characteristics, the productivity module 260 may generate job symbology 360 that represents the current status of the task or job. Generally, the job symbology 360 may depict the progress of the task or job relative to the most previous evaluation, relative to the expected progress, or relative to the overall task or job. Additional details regarding the job symbology 360 will be discussed below.

The map module 280 may receive the scene image 320, the object symbology 340, and/or the job symbology 360. The map module 280 may also receive one or more of the image data 302, vehicle data 304, fleet data 306, mapping data 308, and/or job data 310. Upon receipt, the map module 280 generates a work site map 380. In one embodiment, the work site map 380 may be formed by the scene image 320, which is then layered or modified with the object symbology 340 and/or job symbology 360. For example, the object symbology 340 may cover, replace, or otherwise enhance corresponding object image portions in the scene image 320, and job symbology 360 may similarly cover, replace, or otherwise enhance corresponding job or task-related image portions in the scene image 320.

In one embodiment, the characteristics of the scene image 320, the object symbology 340, and the job symbology 360 depicted in the work site map 380 may be defined or predetermined. In other embodiments, the monitoring system 110 may generate a graphical user interface menu that enables an operator to select desired characteristics for depiction. An example is discussed in greater detail below. In such embodiments, the operator selections may be used by the map module 280 to define the features depicted within the work site map 380.

Upon generation by the map module 280, the work site map 380 may be transmitted to the operator of the control center 120 and/or the operators of the work vehicles 130-133. In particular, the work site map 380 may be transmitted by the communication component 122 of the control center 120 to the work vehicles 130-133 via the communication network 102. Upon receipt, the operator of the work vehicles 130-133 may view the work site map 380 on a visual display (e.g., visual display 154). With respect to work site map 380, it is to be understood that the map may take on various forms for use by operators and/or equipment in accordance with the embodiments herein. The work site map 380 may be generated to be displayed on an electronic display device (e.g., a handheld device or vehicle dash-mounted display), including those described above. In practice, the work site map 380 may be a two dimensional graphical display, a three dimensional graphical display, or a combination of two and three dimensional graphical elements. The work site map 380 may also be stored in data store 126 to facilitate the generation of future work site maps.

Figure 6:
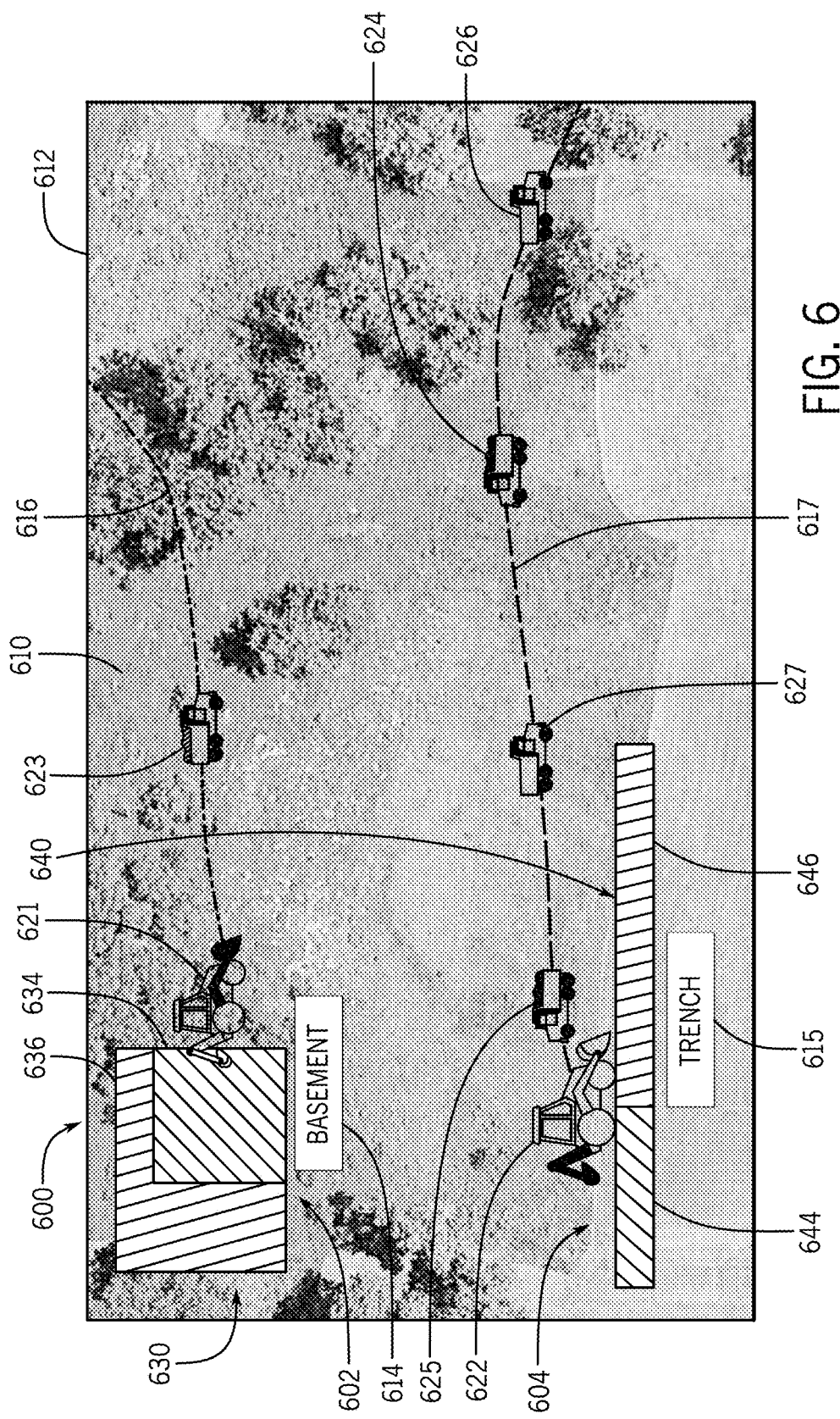
FIG. 6 is an example work site map that may be generated by the work site monitoring system of FIG. 3.

FIG. 6 is an example of a work site map 600 (e.g., corresponding to work site map 380 of FIG. 3) that may be generated for the operator. As described below, the work site depicted by the work site map 600 is defined by a boundary and, in this example, includes two task areas (generally referenced as areas 602, 604). In particular, in this example, a first task area 602 is associated with digging a basement, and a second task area 604 is associated with digging a trench. A number of work vehicles travel to and from the task areas 602, 604 on roads through the work site and/or operate at the task areas. As also described below, the work site map 600 includes a scene image 610 and various types of symbology 612, 614, 615, 616, 617, 621-627, 630 representing characteristics of the work site.

The work site map 600 includes a scene image 610 that, as discussed above, may be formed by stitching together multiple images from one or more unmanned aerial devices 180. In particular, the scene image 610 may be an actual, visual image of the environment of the work site 100 on which the symbology discussed below is layered. As shown, the scene image 610 depicts the work site terrain, vegetation, obstacles, and the like.

In some examples, the scene image 610 may additionally include some level of abstraction or scene symbology that functions to provide additional information about the work site 100. Examples include work site boundary lines 612, task area labels 614, 615 and/or highlighted roads or pathways 616, 617 that are positioned within the scene image 610 in the appropriate locations.

The scene image 610 is additionally overlaid with various types of object symbology 621-627. As discussed above, the object symbology 621-627 may represent the abstraction of the objects within the work site, including the work vehicles and other equipment. In FIG. 6, the object symbology includes work vehicle symbols 621-627 that are displayed on the work site map 600 to provide an indication of the location of the work vehicles in the work site. The work vehicle symbols 621-627 may also provide context and status information about the corresponding vehicle, some of which are discussed above with reference to FIGS. 4A-4E and FIGS. 5A-5E. In the example of FIG. 6, the work vehicle symbols 621-627 indicate the particular type of vehicle, e.g., work vehicle symbols 621, 622 represent backhoe loaders and work vehicle symbols 623-627 represent dump trucks. The work vehicle symbol 621 indicates that the loader of the backhoe loader is active, and the work vehicle symbol 622 indicates that the backhoe of the backhoe loader is active. The work vehicle symbol 623 indicates that the dump truck is moving away from the task area 602 with a load of a first type of material. The work vehicle symbols 624, 625 indicate that the dump trucks are moving toward the task area 604 with load of a second type of material, and the work vehicle symbols 626, 627 indicate that the dump trucks are moving away the task area 604 without loads.

As introduced above, the vehicle symbols 621-627 may reflect health or status information of each vehicle within the work site. Such information may be used by an operator to assess fleet capability in assigning vehicles to particular tasks and/or by service technician operators that may be dispatched to service a vehicle.

The scene image 610 may further be overlaid with job symbology 630, 640, which in this example, is represented for two task areas 602, 604. As noted above, the job symbology 630, 640 may function to depict the progress of the respective task. For example, at task area 602, a basement is being excavated. The task area 602 includes symbology 630 generally representing the overall size of the basement that is overlaid on the image 610 with a first portion 634 generally representing the completed portion of the basement and a second portion 636 representing the unfinished portion of the basement. As another example, at task area 604, a trench is being dug. The task area 604 includes symbology 640 generally representing the overall size of the trench that is overlaid on the image 610 with a first portion 644 representing the completed portion of the trench and a second portion 646 representing the unfinished portion of the trench. As such, this symbology 630, 640 provides an indication of the nature, size, and progress of the underlying tasks.

Any type of job (or productivity) characteristic may be represented by the symbology and such symbology may take various forms. For example, job symbology may be in the form of a number representing orders received or fulfilled. Additional context may reflect material flow by cross referencing the vehicle payload weight information and the haul route on the map (e.g., using vehicle data 304 and/or image data 302). Further job symbology may be implemented by color coded symbology based on the height difference between a topographical scan taken by the unmanned aerial device represented in image data 302 and a target surface topography representing in the job data 310.

Figure 7:
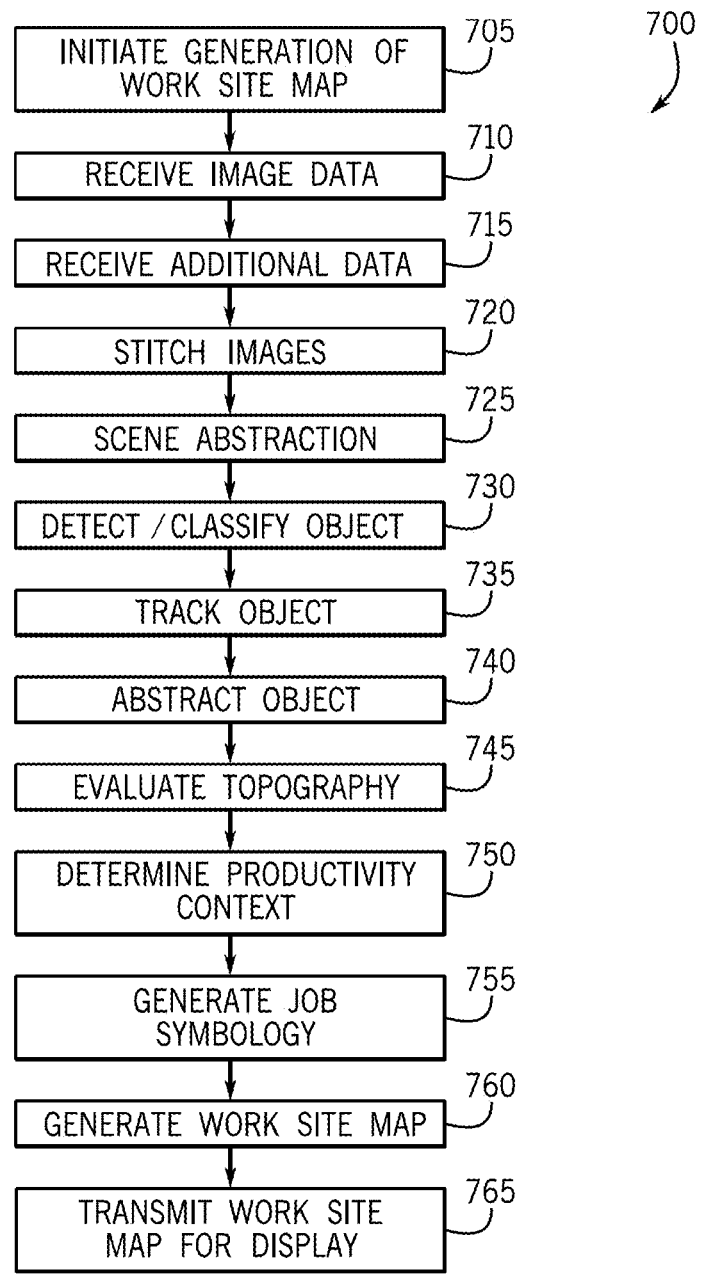
FIG. 7 is a flowchart illustrating an example method of the disclosed system of FIG. 3 in accordance with one of various embodiments.

Referring now also to FIG. 7, as well with continuing reference to FIGS. 1-6, a flowchart illustrates a method 700 that may be performed by the monitoring system 110 in accordance with the present disclosure. As can be appreciated in light of the disclosure, the order of operation within the method 700 is not limited to the sequential execution as illustrated in FIG. 7, but may be performed in one or more varying orders as applicable and in accordance with the present disclosure. Further one or more steps may be omitted and/or additional steps added.

In one example, the method 700 begins at step 705. In step 705, the generation of a work site map by the monitoring system 110 is initiated. The collection of images and/or generation of the work site maps may be initiated in a number of ways, including a manual request by an operator in a work vehicle 130-133 or at the control center 120. In some examples, such functions may be initiated on a schedule, e.g., hourly or daily, as appropriate.

Figure 8:
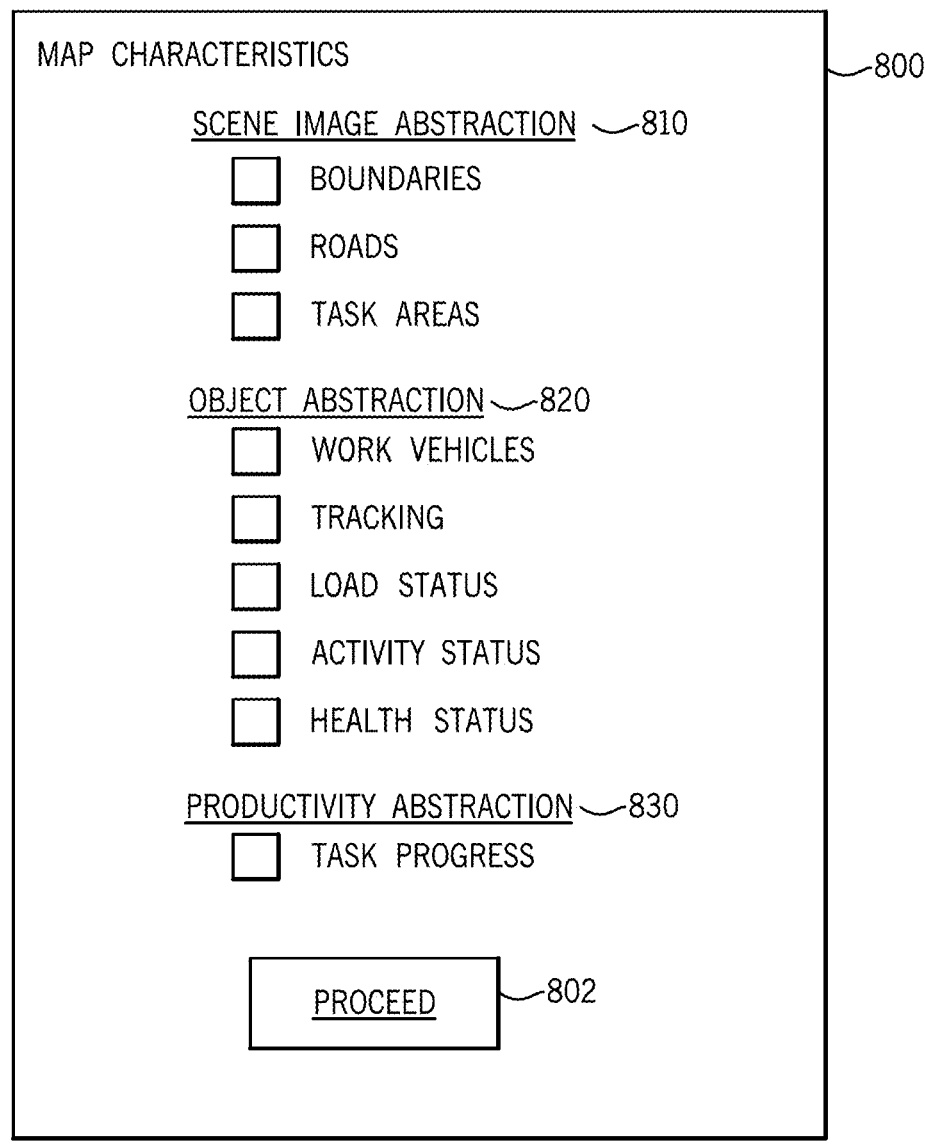
FIG. 8 is an example graphical user interface menu of the method of FIG. 7 in accordance with one of various embodiments.

In some embodiments, an operator may customize or otherwise provide user input regarding the type of information to be displayed on the work site map. This user input may be provided by the operator initiating the work site map in step 705 or provided by the operator viewing the work site map (e.g. in step 765). Reference is briefly made to FIG. 8, which is a graphical user interface menu 800 that may be presented to an operator on a display of a human-machine interface (e.g., within work vehicles 130-133 and/or control center 120). As shown, the menu 800 presents selectable element options 810, 820, 830 representing the symbology available for incorporation into the work site map. As shown, the selectable element options 810, 820, 830 may be organized into scene image abstraction options 810, object abstraction options 820, and/or productivity abstraction options 830. Each option 810, 820, 830 may be further subdivided into more specific types of abstraction items or types, as shown. Upon indicating selection (e.g., by marking or clicking with a cursor-control device or touchscreen), the operator may initiate generation or display of the work site map incorporated the selected options by selecting the "proceed" element 802.

Returning to method 700 in FIG. 7, in step 710, the monitoring system 110 receives image data 302 from one or more of the unmanned aerial devices 180. As noted above, the unmanned aerial device 180 may use a predetermined flight path to cover the full work site at a predetermined interval or, in the case of multiple unmanned aerial devices 180, to cover a designated section of the work site in a predetermined length of time or in sync with other unmanned aerial device 180. The unmanned aerial device 180 captures a sufficient number of images to enable the creation of a fully refreshed image of the work site for that interval.

In step 715, the monitoring system 110 may also receive additional data, such as vehicle data 304, fleet data 306, and job data 310. As noted above, this additional data may be in the form vehicle position data, plan data, service or health data, and the like.

In step 720, the monitoring system 110 stitches or otherwise combines the images from the image data 302 in order to create an overall scene image 320. As noted above, in some embodiments, the monitoring system 110 may receive a complete image of the work site from the unmanned aerial device 180, although generally, the images are combined by the monitoring system, thereby potentially enabling more efficient operation by the unmanned aerial device 180 and/or additional processing of the images with data stored within the monitoring system 110.

In step 725, the monitoring system 110 may abstract one or more aspects of the scene image 320. Examples include roads, task areas, boundaries, and other types of scene information.

In step 730, the monitoring system 110 detects and classifies one or more objects within the image data 302, for example, by using image recognition to evaluate the images. Such detection and classification may be facilitated by the vehicle data 304 and/or fleet data 306.

In step 735, the monitoring system 110 may track one or more object within the work site 100, for example, by comparing current image data 302 to previous image data or work site maps. In one example, the object module 240 may perform this tracking operation by identifying objects in current image data, identifying corresponding objects in previous image data or in previous work site maps, and comparing the positions of the corresponding objects to determine the movement of such objects over time. The tracked objects may be work vehicles 130-133, authorized or errant vehicles or personnel, and/or other types of equipment or material within the work site 100. As an example, such tracking may be used by the monitoring system 110 to inventory or locate materials and/or equipment for depiction on the work site map and/or for other control center systems.

In step 740, the monitoring system 110 may abstract one or more objects within the work site 100. Such object symbology 340 enables more immediate recognition and understanding of the situation and relevant information by a viewer.

In step 745, the monitoring system 110 may identify and determine one or more characteristics the task areas of the work site based on the images within the image data 302. In particular, the monitoring system 110 may identify and determine the topography of the task area. In step 750, the monitoring system 110 may evaluate the characteristics in view of the productivity context. The productivity context may be determined or derived from the job data 310. In step 755, the monitoring system 110 may generate job symbology 360 based on the evaluated characteristics. Such symbology 360 enables more immediate recognition and understanding of the situation and relevant information by a viewer.

In step 765, the monitoring system 110 may generate a work site map 380. In one example, the work site map may be formed by layering the object symbology 340 and the job symbology 360 on the scene image 320. As noted above, the symbology incorporated into the work site map 380 may be based on user selections.

In step 765, the monitoring system 110 may transmit work site map to one or more operators for display. As introduced above, the operators may take various forms, including operators within the work vehicles, operators at the control center, remote or portal operators, service technician operators, etc.

Accordingly, embodiments discussed herein provide work site maps with scene images overlaid with symbology that enhances the nature, amount, type, and utility of the information conveyed to the operator. Examples utilize data from various systems and sources, including job planning information, vehicle information, fleet information, and the like to create a comprehensive work site map.

The work site maps are particularly useful in work sites in which the overall size and changing nature of the terrain and tasks may otherwise make monitoring a somewhat challenging proposition, especially for an operator that is unfamiliar or relatively new to the work site. In accordance with various embodiments, one or more unmanned aerial devices are used to provide images that facilitate the monitoring, evaluating, and mapping of a work site that will useful for completing tasks or jobs. In some embodiments, each work vehicle may be provided with a work site map that enables improved understanding, context, or performance in carrying out task responsibilities. As such, the generation, updating, and maintenance of such work site maps are beneficial to the on-going management of the work site.

Although generally discussed above in the context of a construction work site, embodiments are applicable to other types of work sites, such as in the agriculture, forestry and mining industries. Example work vehicles for implementation include tractors, combines, harvesters, yarders, skylines, feller bunchers, and so on. One particular example may include an agricultural work site in which a windrower cuts a crop and a baler gathers and compresses the cut crop into bales, such that generation of the work site map may facilitate cooperation in identifying operating positions and task progress. In general, the monitoring systems and methods may provide work site maps in various circumstances in which multiple work vehicles cooperate to perform one or more tasks within a job, particularly in environments with backend data sources that may provide additional information to augment or otherwise abstract aspects of a map formed by overhead images.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work site monitoring system, comprising:
   a communication component receiving image data representing at least one image of a work site captured by an imaging apparatus of an unmanned aerial device and receiving vehicle data associated with a first work vehicle at the work site; and
   a controller, with memory and processing architecture for executing instructions stored in the memory, coupled to the communication component, the controller configured to:
     evaluate the image data and generate a scene image of the work site based on at least the image data;
     identify the first work vehicle in the at least one image from the image data;
     abstract the first work vehicle as object symbology;
     generate a first symbol associated with the first work vehicle that indicates a vehicle type and, at least in part based on the vehicle data, one or more of vehicle load characteristics, vehicle health, and vehicle status associated with the first work vehicle; and
     generate a work site map with the first symbol layered onto the scene image.

2. The work site monitoring system of claim 1, wherein the communication component is configured to send the work site map to a work vehicle for display to an operator within the work vehicle.

3. The work site monitoring system of claim 1, wherein the controller is configured to generate the scene image by stitching together multiple images from the image data.

4. The work site monitoring system of claim 1, wherein the controller is configured to generate the first symbol as a first line drawing symbol representing the first work vehicle.

5. The work site monitoring system of claim 1, wherein the communication component further receives fleet data associated with at least the first work vehicle, and wherein the controller is configured to generate the first symbol, at least in part, based on the fleet data.

6. The work site monitoring system of claim 1, wherein the controller is further configured to abstract at least a first characteristic of the scene image, generate scene symbology associated with the scene image, and generate the work site map with the scene symbology layered onto the scene image.

7. The work site monitoring system of claim 6, wherein the controller is configured to generate the scene symbology as at least one of road symbology, a boundary, or a text label.

8. The work site monitoring system of claim 1, wherein the communication component is configured to receive job data and the controller
   is configured to generate job symbology based on the job data and generate the work site map with the job symbology layered onto the scene image.

9. The work site monitoring system of claim 8, wherein the controller is configured to generate the job symbology to represent progress associated with at least one task within the work site.

10. A method of generating a work site map, comprising:
    receiving, with a communication component, image data representing at least one image of a work site captured by an imaging apparatus of an unmanned aerial device;
    receiving, with the communication component, vehicle data associated with a first work vehicle within the work site;
    evaluating, with a controller, the image data and generating a scene image of the work site based on at least the image data;
    identifying, with the controller, the first work vehicle in the work site from the image data;
    abstracting, with the controller, the first work vehicle as object symbology;
    generating, with the controller, a first symbol associated with the first work vehicle that indicates a vehicle type and, at least in part based on the vehicle data, one or more of vehicle load characteristics, vehicle health, and vehicle status associated with the first work vehicle; and
    generating, with the controller, the work site map by layering the first symbol onto the scene image.

11. The method of claim 10, further comprising:
    sending, with the communication component, the work site map to a work vehicle for display to an operator within the work vehicle.

12. The method of claim 10, wherein the generating the scene image includes stitching together multiple images from the image data.

13. The method of claim 10, wherein the abstracting the first work vehicle includes generating the first symbol as a first line drawing symbol representing the first work vehicle.

14. The method of claim 10, further comprising:
abstracting, with a controller, at least a first characteristic of the scene image of the work site to generate scene symbology associated with the scene image, the scene symbology including at least one of road symbology, a boundary, or a text label;
wherein the generating the work site map includes layering the scene symbology onto the scene image with the object symbology.

15. The method of claim 10, further comprising:
receiving, with the communication component, job data associated with at least a first task within the work site; and
generating, with the controller, job symbology based on the job data;
wherein the map module is configured to generate the work site map with the job symbology layered onto the scene image with the object symbology, the job symbology representing progress associated with the first task.

* * * * *